(12) United States Patent
Chien

(10) Patent No.: US 10,156,660 B1
(45) Date of Patent: *Dec. 18, 2018

(54) OPHTHALMIC LENS AND METHOD FOR MANUFACTURING THE SAME

(71) Applicant: MiiCs & Partners (Shenzhen) Co., Ltd., Shen Zhen (CN)

(72) Inventor: Hsiu-Wen Chien, New Taipei (TW)

(73) Assignee: MiiCs & Partners (Shenzhen) Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/652,600

(22) Filed: Jul. 18, 2017

(30) Foreign Application Priority Data

May 31, 2017 (TW) .............................. 106117910 A

(51) Int. Cl.
  *G02B 1/04* (2006.01)
  *C08K 5/3417* (2006.01)
  *C08F 220/28* (2006.01)
  *B29D 11/00* (2006.01)
  (Continued)

(52) U.S. Cl.
  CPC ............ *G02B 1/043* (2013.01); *C08F 220/28* (2013.01); *C08K 5/3417* (2013.01);
  (Continued)

(58) Field of Classification Search
  CPC ...................................................... G02B 1/043
  See application file for complete search history.

(56) References Cited

U.S. PATENT DOCUMENTS 5,187,207 A * 2/1993 Gallas ...................... A62D 7/00
                                                 523/106
5,240,715 A * 8/1993 Ahene ...................... A61K 8/72
                                                 424/574
(Continued)

*Primary Examiner* — Michael F Pepitone
(74) *Attorney, Agent, or Firm* — ScienBiziP, P.C.

(57) ABSTRACT

An method for manufacturing an ophthalmic lens comprises following steps of providing a mixture comprising a gel precursor and a plurality of melanin or melanin analog pigments, each of the plurality of melanin or melanin analog pigment comprising at least one group having a chemical structure of

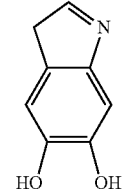

or

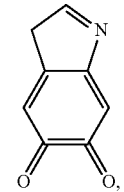

the gel precursor comprising an organic additive selected from a group consisting of dopamine methacrylamide having a chemical structure of

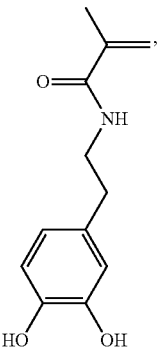

2-aminoethyl methacrylate having a chemical structure of

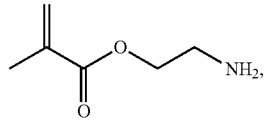

N-(3-aminopropyl)methacrylamide having a chemical structure of

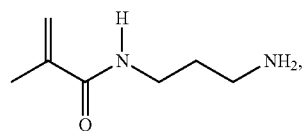

N-(2-aminoethyl)methacrylamide having a chemical structure of

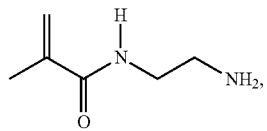

and any combination thereof; feeding the mixture into a mold, and exposing the mixture to ultraviolet radiation or (Continued)

heating the mixture to form a gel substrate, the melanin or melanin analog pigments dispersed in the gel substrate and anchored to the gel substrate, thereby forming the ophthalmic lens. The disclosure also provides an ophthalmic lens.

7 Claims, 3 Drawing Sheets

(51) Int. Cl.
*B29K 77/00* (2006.01)
*B29K 105/00* (2006.01)

(52) U.S. Cl.
CPC .... *B29D 11/00038* (2013.01); *B29K 2077/00* (2013.01); *B29K 2105/0002* (2013.01); *B29K 2105/0061* (2013.01); *C08F 2220/281* (2013.01); *C08F 2220/282* (2013.01)

(56) References Cited

U.S. PATENT DOCUMENTS

| | | | | |
|---|---|---|---|---|
| 5,252,628 A * | 10/1993 | Chirila | ................... | A61L 27/16 |
| | | | | 351/159.33 |
| 6,103,777 A * | 8/2000 | Krishnan | ........... | C08K 5/34922 |
| | | | | 424/401 |
| 9,804,298 B2 * | 10/2017 | Chien | ................... | A61K 33/38 |
| 2005/0009964 A1 * | 1/2005 | Sugimura | ................ | C09K 9/02 |
| | | | | 524/110 |

* cited by examiner

OPHTHALMIC LENS AND METHOD FOR MANUFACTURING THE SAME

FIELD

The subject matter herein generally relates to an ophthalmic lens and a method for manufacturing the ophthalmic lens.

BACKGROUND

Contact lenses are commonly worn by users to correct vision, or for cosmetic or therapeutic reasons. Usually, melanin is dispersed in the contact lens to protect eyes from harmful radiation. However, melanin may be easily diluted by tears when in use.

BRIEF DESCRIPTION OF THE DRAWINGS

Implementations of the present technology will now be described, by way of example only, with reference to the attached figures.

DETAILED DESCRIPTION

Figure 1:
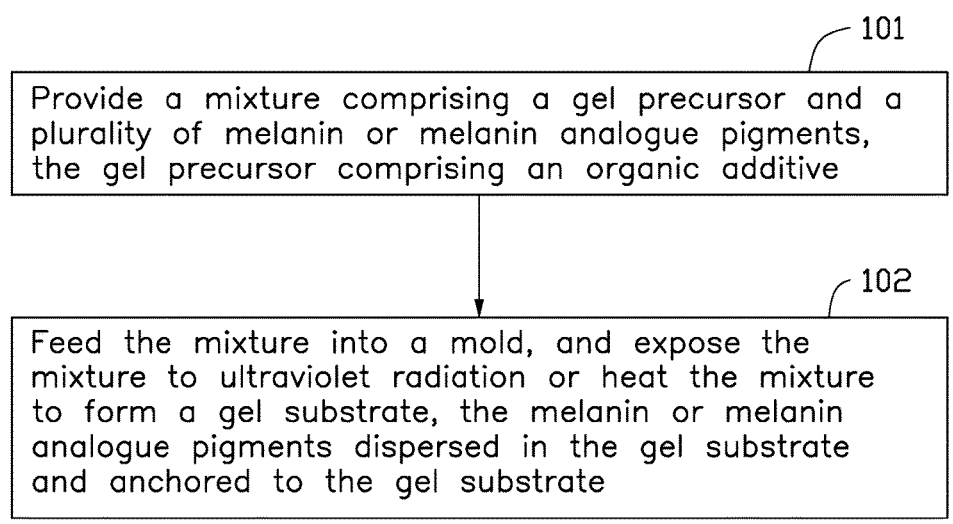
FIG. 1 is a flowchart of an exemplary embodiment of a method for manufacturing an ophthalmic lens.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

FIG. 1 illustrates a flowchart of a method for manufacturing an ophthalmic lens 1 (shown in FIG. 2) in accordance with an exemplary embodiment. The exemplary method is provided by way of example, as there are a variety of ways to carry out the method. Each block shown in FIG. 1 represents one or more processes, methods, or subroutines, carried out in the exemplary method. Furthermore, the illustrated order of blocks is by example only and the order of the blocks can change. Additional blocks may be added or fewer blocks may be utilized, without departing from this disclosure. The exemplary method can begin at block 101.

Figure 2:
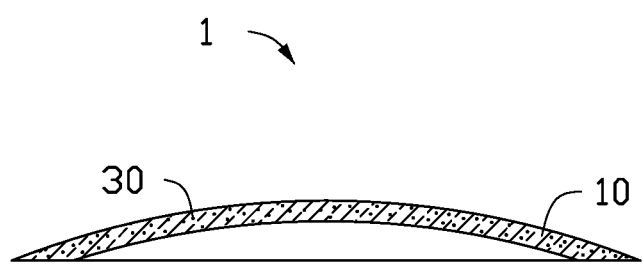
FIG. 2 is a cross-sectional view of an exemplary embodiment of an ophthalmic lens.

At block 101, a mixture is provided that comprises a gel precursor and a plurality of melanin or melanin analogue pigments 30 (shown in FIG. 2). Each melanin or melanin analogue pigment 30 comprises at least one group having a chemical structure of

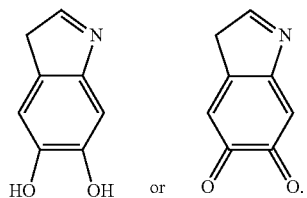

The gel precursor comprises an organic additive. The organic additive is selected from a group consisting of dopamine methacrylamide having a chemical structural formula of

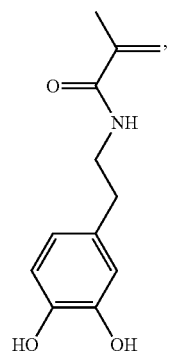

2-aminoethyl methacrylate having a chemical structural formula of

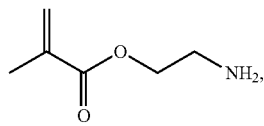

N-(3-aminopropyl)methacrylamide having a chemical structural formula of

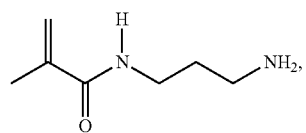

N-(2-aminoethyl)methacrylamide having a chemical structural formula of

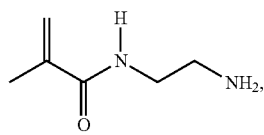

and any combination thereof.

In at least one exemplary embodiment, the melanin or melanin analogue pigments 30 and the organic additive are in a ratio of about 2:5 to about 240:1 by weight.

The melanin or melanin analogue pigments 30 may be natural melanin or melanin analogue pigments or synthetical melanin or melanin analogue pigments.

In at least one exemplary embodiment, the gel precursor further comprises hydrophilic monomers, a cross-linking agent, an initiator, and a solvent. The melanin or melanin analogue pigments 30 have a mass percentage of about 0.05% to about 10% of the total mass of the mixture. The organic additive has a mass percentage of about 4% to about 12% of the total mass of the mixture. The hydrophilic monomers have a mass percentage of about 40% to about 70% of the total mass of the mixture. The cross-linking agent has a mass percentage of about 0.05% to about 3.2% of the total mass of the mixture. The initiator has a mass percentage of about 0.01% to about 4.5% of the total mass of the mixture. The solvent has a mass percentage of about 20% to about 55% of the total mass of the mixture.

The hydrophilic monomers may be selected from a group consisting of methacryloxyalkylsiloxanes, 3-methacryloxypropylpentamethyldisiloxane, bis(methacryloxypropyl)tetramethyl-disiloxane, monomethacrylatedpolydimethylsiloxane, mercapto-terminatedpolydimethylsiloxane, N-[tris(trimethylsiloxy)silylpropyl]acrylamide, N-[tris(trimethylsiloxy)silylpropyl]methacrylamide, tris(pentamethyldisiloxyanyl)-3-methacrylatopropylsilane (T2), 3-methacryloxypropyltris(trimethylsiloxy)silane, 2-hydroxyethylmethacrylate (HEMA), methyl methacrylate, hydroxyethyl acrylate, hydroxypropyl acrylate, hydroxypropyl methacrylate (HPMA), trimethylammonium 2-hydroxy propylmethacrylate hydrochloride, dimethylaminoethyl methacrylate (DMAEMA), dimethylaminoethylmethacrylamide, acrylamide, methacrylamide, allyl alcohol, vinylpyridine, glycerol methacrylate, N-(1,1dimethyl-3-oxobutyl)acrylamide, N-vinyl-2-pyrrolidone (NVP), acrylic acid, methacrylic acid, N,N-dimethyacrylamide (DMA), and any combination thereof.

The initiator may be a photoinitiator or a thermal initiator.

The photoinitiator may be selected from a group consisting of benzoin methyl ether, diethoxyacetophenone, a benzoylphosphine oxide initiator, ethyl 2-dimethylaminobenzoate, 2-isopropylthioxanthone, 1-hydroxycyclohexyl phenyl ketone, Darocur type initiator, Irgacur type initiator, and any combination thereof. In at least one exemplary embodiment, the photoinitiator may be Irgacure-1173. The benzoylphosphine oxide initiator may be selected from a group consisting of 2,4,6-trimethylbenzoyldiphenylophosphine oxide, bis-(2,6-dichlorobenzoyl)-4-N-propylphenylphosphine oxide, bis-(2,6-dichlorobenzoyl)-4-N-butylphenylphosphine oxide, and any combination thereof.

The thermal initiator may be selected from a group consisting of 2,2'-azobis (2,4-dimethylpentanenitrile), 2,2'-azobis (2-methylpropanenitrile), 2,2'-azobis (2-methylbutanenitrile), azobisisobutyronite (AIBN), peroxide, and any combination thereof. The peroxide can be benzoyl peroxide.

The cross-linking agent may be selected from a group consisting of ethylene glycol dimethacrylate (EGDMA), trimethylolpropane trimethacrylate (TMPTMA), tri(ethylene glycol) dimethacrylate (TEGDMA), tri(ethylene glycol) divinyl ether (TEGDVE), trimethylene glycol dimethacrylate, and any combination thereof.

The solvent can be water or organic solvent.

The organic solvent may be selected from a group consisting of tetrahydrofuran, tripropylene glycol methyl ether, dipropylene glycol methyl ether, ethylene glycol n-butyl ether, diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, ethanol, 2-butanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and any combination thereof.

At block 102, referring to FIG. 2, the mixture is fed into a mold (not show) and is exposed to ultraviolet radiation or heated, so the gel precursor in the mixture undergoes a polymerization reaction and forms a gel substrate 10, thus forming the ophthalmic lens 1. The melanin or melanin analogue pigments 30 are dispersed in the gel substrate 10.

The organic additive comprises at least one of catechol groups and amine groups. The melanin or melanin analogue pigments 30 comprises at least one of catechol groups and 1,2-benzoquinone. Thus, the catechol groups or the 1,2-benzoquinone of the melanin or melanin analogue pigments 30 can react with the at least one of catechol groups and amine groups of the gel substrate 10 to cause the melanin or melanin analogue pigments 30 to be anchored to the gel substrate 10. Thus, the melanin or melanin analogue pigments 30 are not easily released from the gel substrate 10, and the ophthalmic lens 1 can retain resistance to harmful radiation.

In at least one exemplary embodiment, the mixture is exposed to ultraviolet radiation for about 5 min to about 20 min. The mixture is heated at about 65 degrees Celsius to about 95 degrees Celsius for about 30 min to about 120 min.

Figure 3:
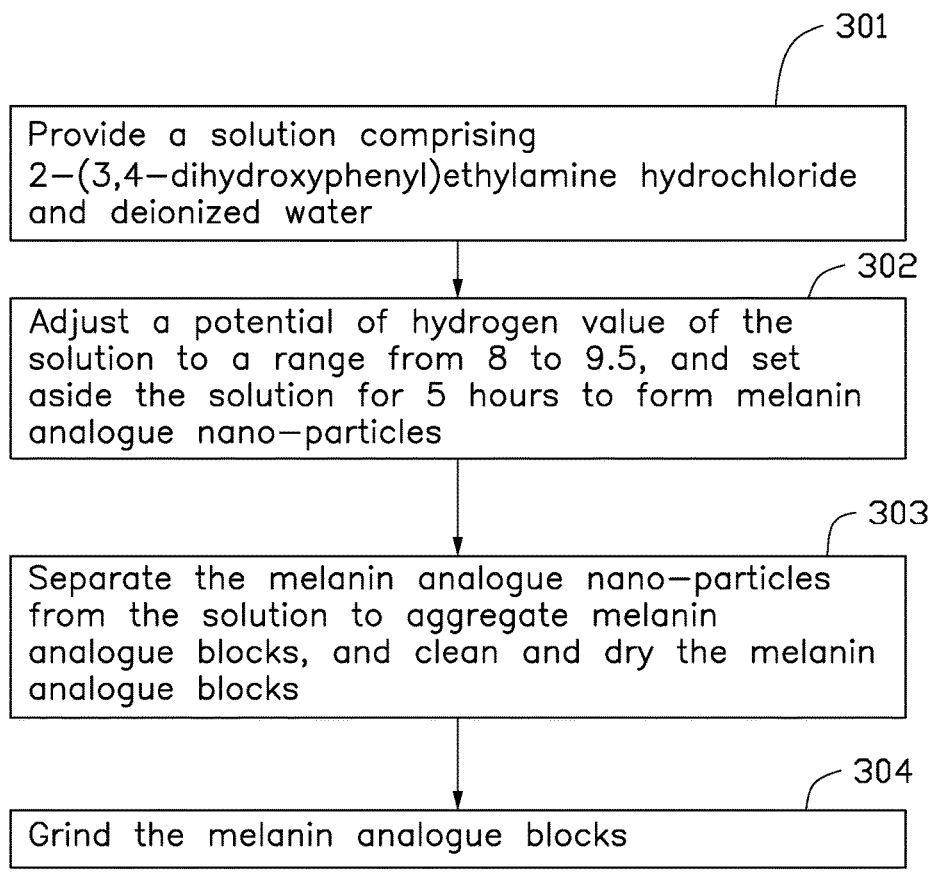
FIG. 3 is a flowchart of an exemplary embodiment of a method for manufacturing melanin or melanin analogue pigments.

In at least one exemplary embodiment, the melanin or melanin analogue pigments 30 are synthetical melanin or melanin analogue pigments. FIG. 3 illustrates a flowchart of a method for manufacturing the melanin or melanin analogue pigments 30. The exemplary method can begin at block 301.

At block 301, a solution is provided by mixing 2-(3,4-dihydroxyphenyl)ethylamine hydrochloride (dopamine.HCl) and deionized water. The dopamine.HCl has a concentration of about 0.5 mg/mL to about 3 mg/mL.

In at least one exemplary embodiment, the dopamine.HCl has the concentration of 0.5 mg/mL.

At block 302, a potential of hydrogen (pH) value of the solution is adjusted to the range from about 8 to about 9.5, and then the solution is set aside for about 5 hours to form melanin analogue nano-particles.

During the formation of the melanin analogue nano-particles, the dopamine.HCl is oxidized, and the oxidized dopamine.HCl reacts to form the melanin analogue nano-particles.

In at least one exemplary embodiment, the pH value of the solution is adjusted to about 8.5.

At block 303, the solution is centrifuged to separate the melanin analogue nano-particles that may aggregate melanin analogue blocks, and then the melanin analogue blocks are cleaned and dried.

At block 304, the melanin analogue blocks are grinded to obtain the melanin analogue pigments.

In another exemplary embodiment, the melanin or melanin analogue pigments 30 are natural melanin or melanin analogue pigments that may be directly extracted from plants or animals.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps Example 1

A mixture was formed by mixing about 2.6 mg of dopamine methacrylamide, about 3.5 mg of N-(3-aminopropyl)methacrylamide, about 57.8 mg of 2-hydroxyethylmethacrylate, about 0.15 mg of ethylene glycol dimethacrylate, about 0.25 mg of Irgacure-1173, about 0.08 mg of melanin or melanin analogue pigments, and about 40 mg of water. The mixture was fed into a mold and was exposed to ultraviolet radiation for 17 min, thus forming an ophthalmic lens.

Example 2

A mixture was formed by mixing about 1.8 mg of dopamine methacrylamide, about 6.5 mg of N-(3-aminopropyl)methacrylamide, about 58 mg of 2-hydroxyethylmethacrylate, about 0.135 mg of ethylene glycol dimethacrylate, about 0.36 mg of azobisisobutyronitrile, about 0.1 mg of the melanin or melanin analogue pigments, and about 38 mg of water. The mixture was fed into a mold and was heated at 85 degrees Celsius for 120 min, thus forming an ophthalmic lens.

Example 3

A mixture was formed by mixing about 6.3 mg of dopamine methacrylamide, about 9.8 mg of 2-hydroxyethylmethacrylate, about 23 mg of N-vinyl-2-pyrrolidone, about 33 mg of 3-methacryloxypropyletris(trimethylsiloxy)silane, about 0.48 mg of ethylene glycol dimethacrylate, about 0.66 mg of Irgacure-1173, about 0.25 mg of the melanin or melanin analogue pigments, and about 40 mg of ethanol. The mixture was fed into a mold and was exposed to ultraviolet radiation for 20 min, thus forming an ophthalmic lens.

Example 4

A mixture was formed by mixing about 2.1 mg of dopamine methacrylamide, about 4.5 mg of N-(3-aminopropyl)methacrylamide, about 9.8 mg of 2-hydroxyethylmethacrylate, about 23 mg of N-vinyl-2-pyrrolidone, about 31 mg of 3-methacryloxypropyletris(trimethylsiloxy)silane, about 0.36 mg of ethylene glycol dimethacrylate, about 0.66 mg of Irgacure-1173, about 0.27 mg of melanin or melanin analogue pigments, and about 40 mg of ethanol. The mixture was fed into a mold and was exposed to ultraviolet radiation for 20 min, thus forming an ophthalmic lens.

FIG. 2 illustrates an exemplary embodiment of an ophthalmic lens 1. The ophthalmic lens 1 comprises a gel substrate 10 and a plurality of melanin or melanin analogue pigments 30 dispersed in the gel substrate 10 and anchored to the gel substrate 10. Each melanin or melanin analogue pigment 30 comprises at least one group having chemical structure of

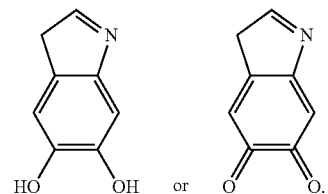

The gel substrate 10 is formed by a polymerization reaction of a gel precursor comprising an organic additive. The organic additive is selected from a group consisting of dopamine methacrylamide having a chemical structural formula of

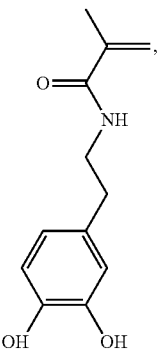 [SMILES: C=C(C)C(=O)NCCc1ccc(O)c(O)c1]

2-aminoethyl methacrylate having a chemical structural formula of

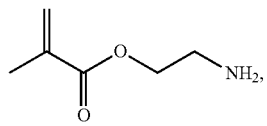

N-(3-aminopropyl)methacrylamide having a chemical structural formula of

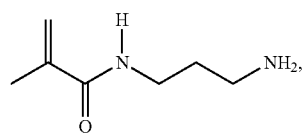

N-(2-aminoethyl)methacrylamide having a chemical structural formula of

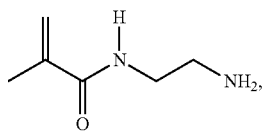

and any combination thereof. So that the gel substrate 10 comprises at least one of catechol group and amine group.

The melanin or melanin analogue pigments are bonded to the at least one of catechol groups and amine groups of the gel substrate 10 to cause the melanin or melanin analogue pigments to be anchored to the gel substrate 10.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A method for manufacturing an ophthalmic lens comprising:
    providing a mixture comprising a gel precursor and a plurality of melanin or melanin analogue pigments, each of the plurality of melanin or melanin analogue pigments comprising at least one group having a chemical structure of

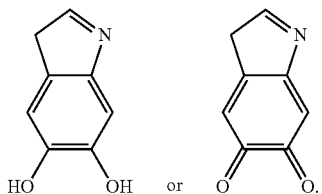

the gel precursor comprising an organic additive selected from a group consisting of dopamine methacrylamide having a chemical structural formula of

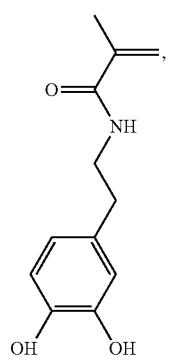 [SMILES: C=C(C)C(=O)NCCc1ccc(O)c(O)c1]

2-aminoethyl methacrylate having a chemical structural formula of

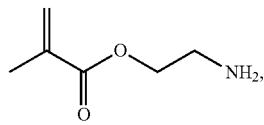

N-(3-aminopropyl)methacrylamide having a chemical structural formula of

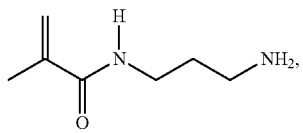

N-(2-aminoethyl)methacrylamide having a chemical structural formula of

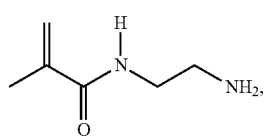

and any combination thereof; wherein the gel precursor further comprises hydrophilic monomers, a cross-linking agent, an initiator, and a solvent; wherein the melanin or melanin analogue pigments have a mass percentage of 0.05% to 10% of the total mass of the mixture, the organic additive has a mass percentage of 4% to 12% of the total mass of the mixture, the hydrophilic monomers have a mass percentage of 40% to 70% of the total mass of the mixture, the cross-linking agent has a mass percentage of 0.05% to 3.2% of the total mass of the mixture, the initiator has a mass percentage of 0.01% to 4.5% of the total mass of the mixture, and the solvent has a mass percentage of 20% to 55% of the total mass of the mixture; and
    feeding the mixture into a mold, and exposing the mixture to ultraviolet radiation or heating the mixture, to cause the gel precursor to form a gel substrate, the melanin or melanin analogue pigments dispersed in the gel substrate and anchored to the gel substrate, thereby forming the ophthalmic lens.

2. The method of claim 1, wherein the initiator is a photoinitiator or a thermal initiator.

3. The method of claim 1, wherein the melanin or melanin analogue pigments are made by the following steps:
    providing a solution comprising 2-(3,4-dihydroxyphenyl)ethylamine hydrochloride;
    adjusting a potential of hydrogen value of the solution to a range from 8 to 9.5, and setting aside the solution for 5 hours to form melanin analogue nano-particles; and
    separating the melanin analogue nano-particles from the solution to aggregate melanin analogue blocks, and cleaning and drying the melanin analogue blocks; and grinding the melanin analogue blocks to obtain the melanin or melanin analogue pigments.

4. The method of claim 3, wherein the 2-(3,4-dihydroxyphenyl)ethylamine hydrochloride has a concentration of about 0.5 mg/mL to about 3 mg/mL.

5. The method of claim 1, wherein the mixture is exposed to ultraviolet radiation for 5 min to 20 min.

6. The method of claim 1, wherein the mixture is heated at 65 degrees Celsius to 95 degrees Celsius for 30 min to 120 min.

7. An ophthalmic lens comprising:
a gel substrate formed by polymerizing a gel precursor, the gel precursor comprising an organic additive selected from a group consisting of dopamine methacrylamide having a chemical structural formula of

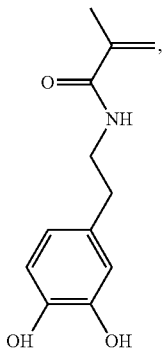 [SMILES: C=C(C)C(=O)NCCc1ccc(O)c(O)c1]

2-aminoethyl methacrylate having a chemical structural formula of

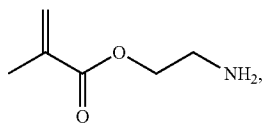

N-(3-aminopropyl)methacrylamide having a chemical structural formula of

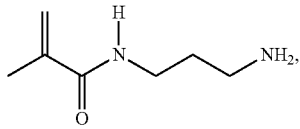

N-(2-aminoethyl)methacrylamide having a chemical structural formula of

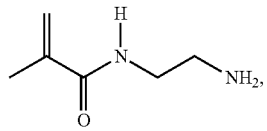

and any combination thereof; and a plurality of melanin or melanin analogue pigments dispersed in the gel substrate and anchored to the gel substrate, each of the plurality of melanin or melanin analogue pigments comprising at least one group having a chemical structure of

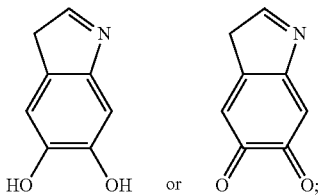

wherein the gel precursor further comprises hydrophilic monomers, a cross-linking agent, an initiator, and a solvent; wherein the melanin or melanin analogue pigments have a mass percentage of 0.05% to 10% of the total mass of the mixture, the organic additive has a mass percentage of 4% to 12% of the total mass of the mixture, the hydrophilic monomers have a mass percentage of 40% to 70% of the total mass of the mixture, the cross-linking agent has a mass percentage of 0.05% to 3.2% of the total mass of the mixture, the initiator has a mass percentage of 0.01% to 4.5% of the total mass of the mixture, and the solvent has a mass percentage of 20% to 55% of the total mass of the mixture.

* * * * *